(12) United States Patent
Roffe et al.

(10) Patent No.: US 10,228,017 B2
(45) Date of Patent: Mar. 12, 2019

(54) ENCAPSULATED CARRIER HUB AND THRUST NEEDLE BEARING ASSEMBLY

(71) Applicant: Schaeffler Technologies AG & Co. KG, Herzogenaurach (DE)

(72) Inventors: Dennis Roffe, Fort Mill, SC (US); James Kevin Brown, Rock Hill, SC (US); Charles Schwab, Fort Mill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/673,975

(22) Filed: Aug. 10, 2017

(65) Prior Publication Data

US 2019/0048926 A1  Feb. 14, 2019

(51) Int. Cl.
*F16C 19/30* (2006.01)
*F16C 33/46* (2006.01)
*F16C 33/54* (2006.01)

(52) U.S. Cl.
CPC ........ *F16C 19/305* (2013.01); *F16C 33/4682* (2013.01); *F16C 33/542* (2013.01)

(58) Field of Classification Search
CPC ... F16C 19/305; F16C 33/4682; F16C 33/542
See application file for complete search history.

(56) References Cited

U.S. PATENT DOCUMENTS

| | | | |
|---|---|---|---|
| 6,857,787 B1* | 2/2005 | Meier | F16C 19/10 384/619 |
| 7,637,664 B2 | 12/2009 | Kiyosawa et al. | |
| 8,821,028 B2* | 9/2014 | Fugel | F16C 35/06 384/621 |
| 9,528,559 B2* | 12/2016 | Lee | F16D 23/145 |
| 9,618,047 B2* | 4/2017 | Malik | F16C 35/06 |
| 9,933,010 B2* | 4/2018 | Brown | F16C 19/305 |
| 2005/0232529 A1* | 10/2005 | Muntnich | F16C 19/30 384/622 |
| 2006/0193549 A1* | 8/2006 | Fugel | F16C 19/30 384/620 |
| 2011/0214958 A1 | 9/2011 | Sturgin et al. | |
| 2011/0290610 A1 | 12/2011 | Arnold et al. | |
| 2014/0150586 A1 | 6/2014 | Kanai | |

FOREIGN PATENT DOCUMENTS

CN    104061319 A    9/2014
WO    2005103515 A1   11/2005

* cited by examiner

*Primary Examiner* — Thomas R Hannon
(74) *Attorney, Agent, or Firm* — Volpe and Koenig, P.C.

(57) ABSTRACT

A carrier hub assembly includes a carrier hub and a bearing assembly. The carrier hub includes an end portion having a first face surface and a second face surface. The bearing assembly includes a first bearing positioned on the first face surface and a second bearing positioned on the second face surface. Each bearing includes a pair of washers forming a pair of races, a cage, and a plurality of rolling elements. The bearing assembly further includes a connecting sleeve connecting the first bearing to the second bearing. The connecting sleeve retains the first bearing and the second bearing on the carrier hub.

11 Claims, 4 Drawing Sheets

ENCAPSULATED CARRIER HUB AND THRUST NEEDLE BEARING ASSEMBLY

FIELD OF INVENTION

The present invention relates to a carrier hub assembly, and, more particularly, to a transmission assembly having a carrier hub which is encapsulated by a thrust needle bearing assembly having a connecting sleeve which interconnects the components.

BACKGROUND

Modern planetary automatic transmissions have relatively complex and flexible architectures in order to provide a wide variety of speed ratios in an overall compact arrangement with a minimal number of components. In order to achieve a large number of speed ratios, many transmissions include features which allow for selective decoupling of certain transmission components. This functionality may be provided by supporting planetary ring gears or certain clutch elements on a single carrier hub. These carrier hubs are often referred to as "ring gear carrier hubs" or "clutch carrier hubs" as they support their respective mating ring gears or clutch components. These carrier hubs are typically supported on opposite faces by thrust bearings which may support axial loads generated by a transmission component attached to the carrier hub (i.e., planetary ring gear) or thrust forces transmitted from mating parts through the carrier hub.

FIG. 1 illustrates a partial view of a prior art transmission 100 including a ring gear carrier hub 110. The ring gear carrier hub 110 supports a ring gear 120. A pair of thrust bearings 130, 140 are positioned in contact with opposing thrust faces of the ring gear carrier hub 110. The carrier hub 110 includes an inner end 150 adjacent to the thrust bearings 130, 140. Other existing carrier hubs may have a similar construction and may similarly support ring gears, clutch components, a combination of the two, or other transmission components.

Currently, it is necessary to assemble and install the thrust bearings and carrier hub individually (i.e., the bearings are installed in the transmission separately from the carrier hub). This complicates the assembly process and can lead to misalignment of the parts and/or damage to the transmission. The need for thrust bearings on both thrust faces of the carrier hub further compounds these issues, making both assembly and guidance of the bearings a challenge during the overhead/inverted assembly process that is used for many transmission assemblies.

The present disclosure is directed to overcoming these and other problems of the prior art.

SUMMARY

In one aspect, the present disclosure is directed to a carrier hub assembly. The carrier hub assembly includes a carrier hub and a bearing assembly. The carrier hub includes an end portion having a first face surface and a second face surface. The bearing assembly includes a first bearing positioned on the first face surface and including a first washer forming a first race, a second washer forming a second race, a first cage, and a first plurality of rolling elements. The bearing assembly also includes a second bearing positioned on the second face surface and including third washer forming a third race, a fourth washer forming a fourth race, a second cage, and a second plurality of rolling elements. The bearing assembly further includes a connecting sleeve connecting the first bearing to the second bearing. The connecting sleeve retains the first bearing and the second bearing on the carrier hub.

BRIEF DESCRIPTION OF THE DRAWING(S)

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure is directed to a carrier hub and bearing assembly which encapsulates the carrier hub to provide a combined assembly which interconnects the components for installation in a transmission assembly. The bearing assembly includes a pair of thrust bearings which are positioned on opposing faces of the carrier hub. The two bearings may be typical axial bearings of equal or different diameters and are connected together in a tiered fashion onto the carrier hub inner diameter by utilizing a connecting sleeve. The connecting sleeve provides both guidance for the bearings as well as retention to the carrier hub. The connecting sleeve may be configured to connect to a feature of each bearing, such as a flange of a washer or a cage. The connecting sleeve may include flexible flanges which assist installation.

Figure 1:
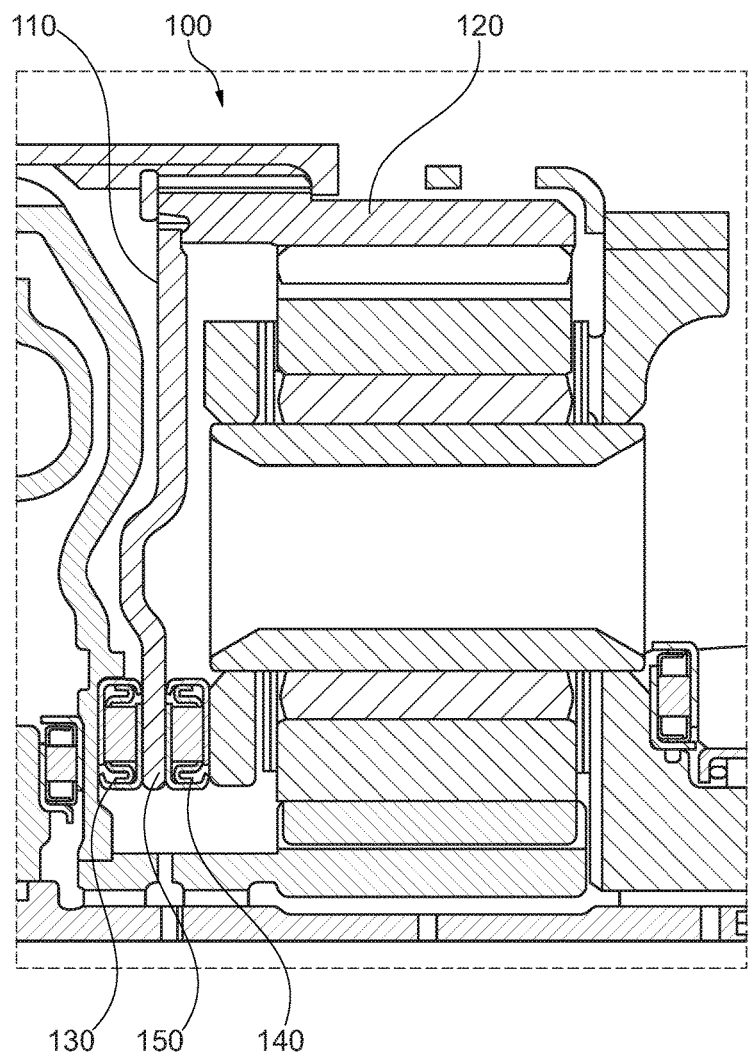
FIG. 1 is a cross-sectional view of a portion of a prior art transmission assembly.
Figure 2:
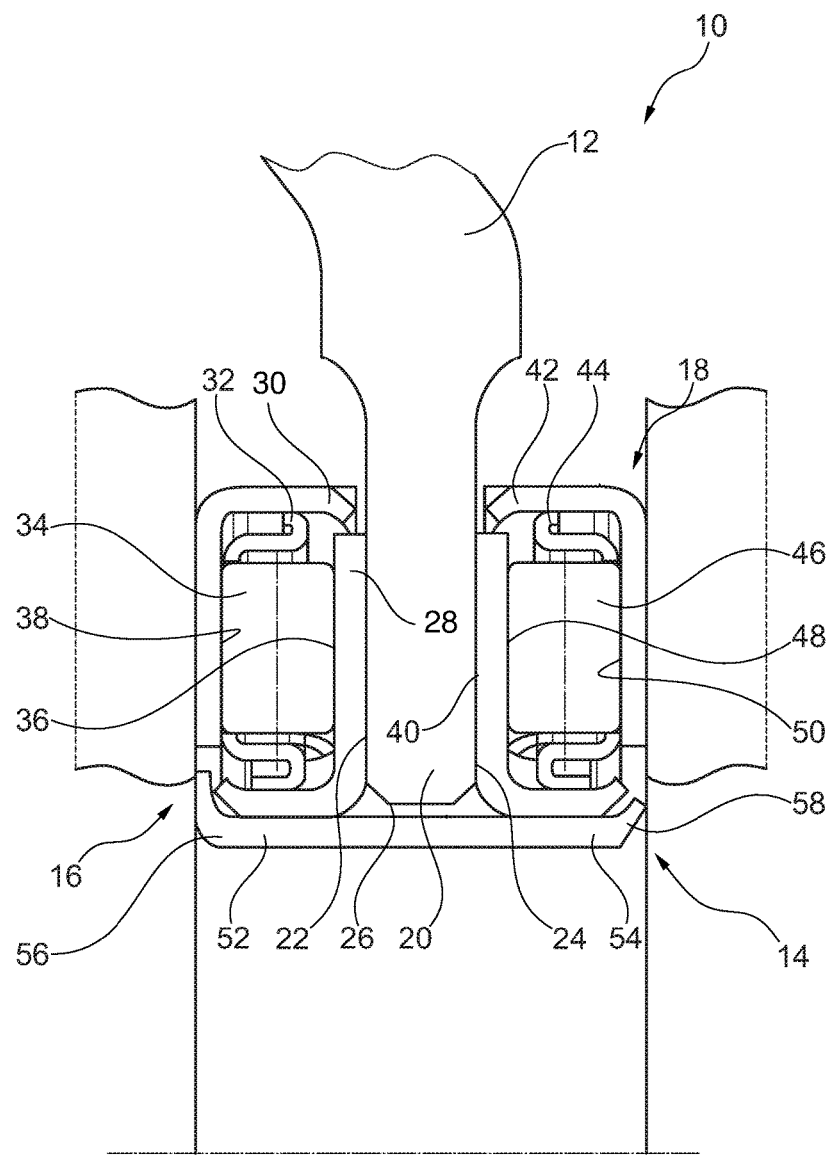
FIG. 2 is a cross-sectional view of a needle bearing assembly installed on a carrier hub, according to a first embodiment.

FIG. 2 is a cross-sectional view of a carrier hub assembly 10, according to a first embodiment. The carrier hub assembly 10 includes a carrier hub 12 and a bearing assembly 14. The thrust bearing assembly includes a pair of bearings 16, 18. The carrier hub 12 is preferably a component of a transmission, such as a planetary automatic transmission for a vehicle. For example, the carrier hub 12 may be a ring gear carrier hub or a clutch carrier hub. The carrier hub 12 is not limited to these components, however, and could be other carrier components used in conjunction with bearing assemblies.

The carrier hub 12 is preferably relatively thin in at least one dimension and includes an end portion 20. In one embodiment, the end portion 20 is an inner end portion formed at an inner diameter boundary of the disk-like carrier hub 12. At the end portion 20, the carrier hub 12 includes a first face surface 22, a second face surface 24, and an end surface 26. In an exemplary embodiment, the first and second face surfaces 22, 24 are parallel to each other and extend in a radial direction within the carrier hub assembly 10. The end surface 26 extends in an axial direction and forms the inner end boundary of the carrier hub 12.

The first bearing 16 includes a first washer 28, a second washer 30, a cage 32, and a plurality of rolling elements 34. The first washer 28 forms a first race 36 and the second washer 30 forms a second race 38 for the rolling elements 34. The cage 32 holds the plurality of rolling elements 34 and positions them in contact with the races 36, 38.

The second bearing 18 similarly includes a first washer 40, a second washer 42, a cage 44, and a plurality of rolling elements 46. The first washer forms a first race 48 and the second washer 42 forms a second race 50 for the rolling elements 46. The cage 44 holds the plurality of rolling elements 46 and positions them in contact with the races 48, 50. The rolling elements 34, 46 are preferably needles, although other configurations are possible. It should be understood that the naming convention used herein is for convenience and that the first washer 40, first race 48, second washer 42, second race 50, cage 44, and plurality of rolling elements 46 may also be considered a third washer, third race, fourth washer, fourth race, second cage, and second plurality of rolling elements, respectively, in order to differentiate over the elements of the first bearing 16.

The first bearing 16 may be interlocking, with the first washer 28 and second washer 30 including tabs which clip into the cage 32. The second bearing 18 may be similarly configured, with the first and second washers 40, 42 clipping into the cage 44. In the embodiment illustrated in FIG. 2, the washers 28, 30, 40, 42 are L-shaped with a radial flange defining the races 36, 38, 48, 50 and an axial flange extending toward the opposite washer. The axial flanges may include retention tabs which clip into the corresponding cage, in a manner known in the art.

The first bearing 16 is positioned in contact with the first face surface 22 of the carrier hub 12 and the second bearing 18 is positioned in contact with the second face surface 24 of the carrier hub 12. In one embodiment, the radial flange of the first washer 28 of the first bearing 16 contacts the first face surface 22 and the radial flange of the first washer 40 of the second bearing 18 contacts the second face surface 24. The second washers 30, 42 may be positioned in contact with adjacent components of the carrier hub assembly 10, such as another carrier component, a transmission case, etc.

According to disclosed embodiments, the bearing assembly 14 includes additional components which interconnect the bearings 16, 18 with each other on the carrier hub 12. The bearing assembly 14 preferably includes a connecting sleeve 52. The connecting sleeve 52 may be formed as a generally-cylindrical component which includes a body portion 54 extending between opposing axial end portions 56, 58.

The body portion 54 is formed as a thin-walled portion is positioned at end portion 20 of the carrier hub 12. The connecting sleeve 52 preferably includes an outer diameter in the body portion 54 which is approximately equal to or slightly less than the inner diameter of the carrier hub 12. The connecting sleeve 52 includes an axial length L which is greater than a length of the end surface 26 such that the connecting sleeve 52 traverses from the first bearing 16 to the second bearing 18. In the embodiment of FIG. 2, the axial flanges of the first washers 28, 40 are supported on the body portion 54 of the connecting sleeve 52.

Figure 3:
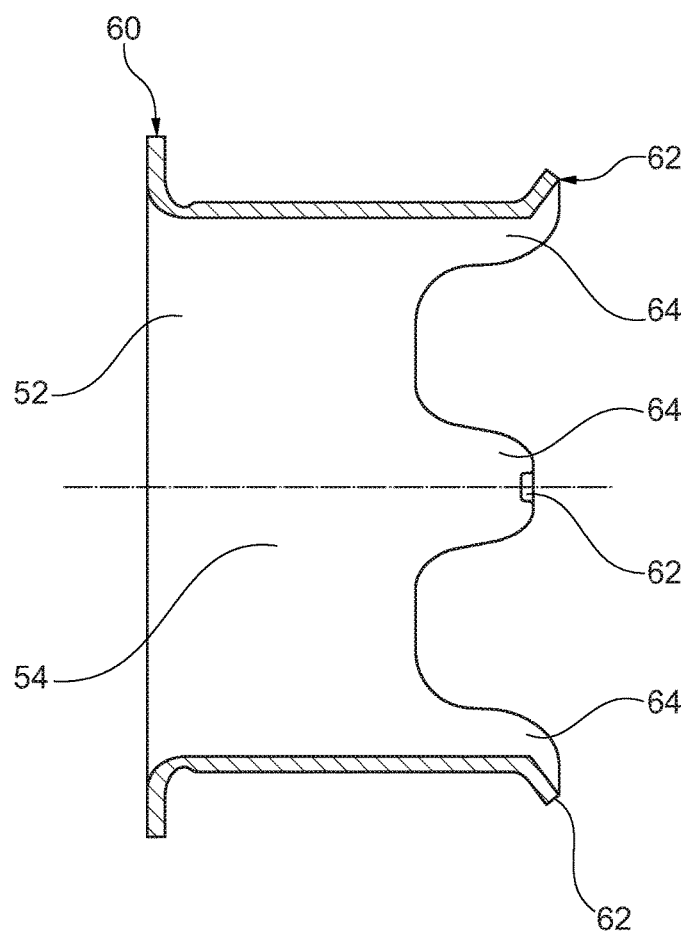
FIG. 3 is a cross-sectional view of an exemplary embodiment of a connecting sleeve of the disclosed needle bearing assemblies.

The connecting sleeve 52 preferably includes attachment portions formed at the axial end portions 56, 58 which connect to one of the bearings 16, 18. FIG. 3 further illustrates the connecting sleeve 52. In one embodiment, the connecting sleeve 52 includes a flange 60 formed at the axial end portion 56. The flange 60 extends in a radial direction and retains the connecting sleeve 52 to the first bearing 16. For example, the flange 60 may be formed as a 360° flange or could extend only partially around the perimeter of the connecting sleeve 52.

The flange 60 is preferably configured to abut a portion of the first bearing 16. For example, the flange 60 may contact the axial flange of the first washer 28. The flange 60 may include an outer diameter sized to prevent the first bearing 16 from sliding axially off of the connecting sleeve 52.

At the opposite axial end portion 56, another attachment portion may be formed. As shown in FIG. 3, the second axial end portion 56 may include a plurality of retention tabs 62. The retention tabs 62 may be configured to clip into one or more features of the second bearing 18. For example, the retention tabs 62 may attach to the axial flange of the first washer 40.

In an exemplary embodiment, the retention tabs 62 may be formed on one or more flexible extensions 64. The flexible extensions 64 are spaced apart from each other in a circumferential direction and are flexible to allow the connecting sleeve to be inserted into the inner diameter openings of the carrier hub 12 and first and second bearings 16, 18. For example, the flexible extensions 64 may be depressed inward to decrease an outer diameter of the connecting sleeve at the second axial end portion 56. While the flange 60, retention tabs 62, and flexible extensions 64 are described herein, it should be understood that any combination of all or some of these features may be implemented with connecting sleeve 52 to retain the bearings 16, 18 to the carrier hub 12. In other embodiments, other attachment features may be used.

It should be understood that the disclosed features are exemplary and that other features and combinations of features are possible. For example, instead of axial thrust bearings, disclosed features may be used in combination with other bearings, such as roller bearings, ball bearings, cage-less bearings, non-contact bearings, oil bearings, etc. In other embodiments, only one bearing may be connected to a carrier hub using a connecting sleeve. The design and geometry of the connecting sleeve may be adjusted based on the dimensions of the bearings and the carrier hub in order to best retain these components as a single assembly.

Figure 4:
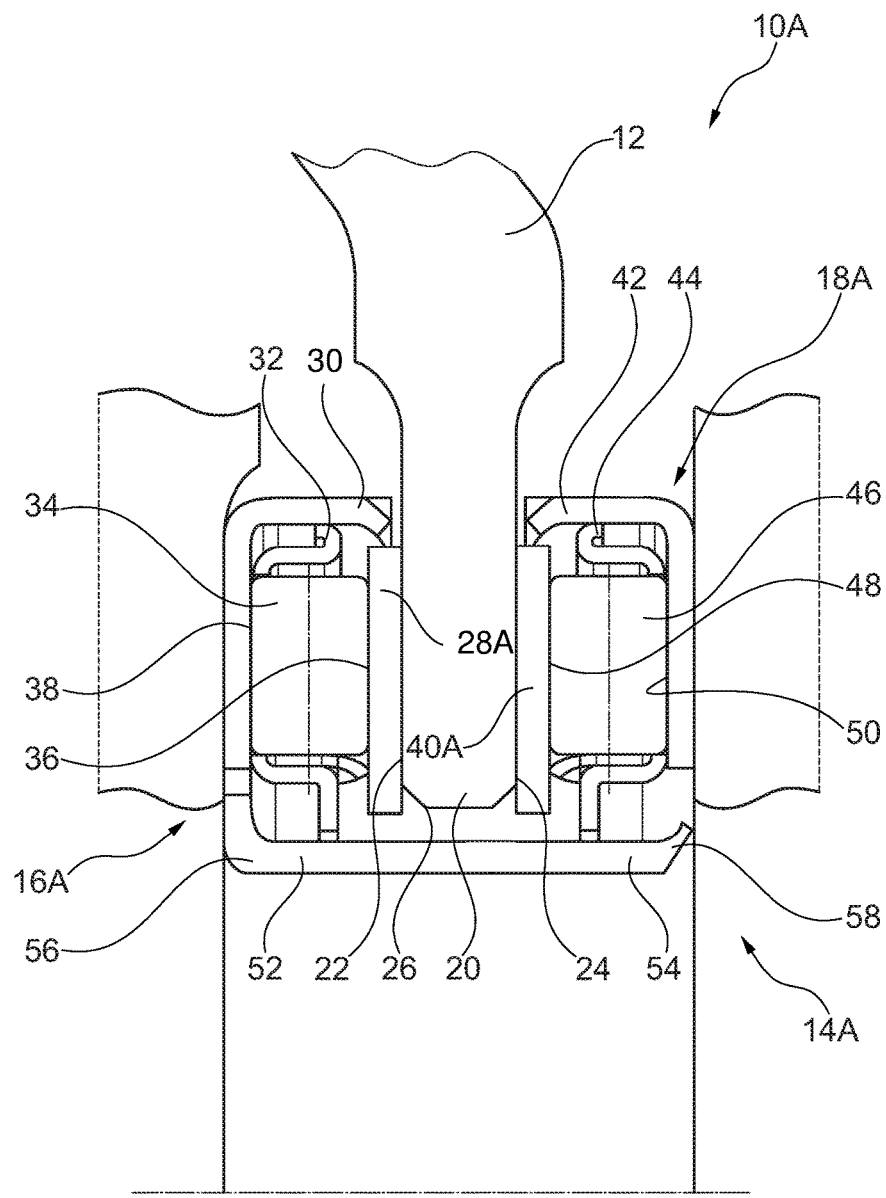
FIG. 4 is a cross-sectional view of another needle bearing assembly installed on a carrier hub, according to a second embodiment.

FIG. 4 illustrates another carrier hub assembly 10A including the carrier hub 12 and a bearing assembly 14A, according to a second embodiment. In this embodiment, the first washers 28A, 40A are formed as flat washers (i.e., they do not include an axial flange). The flat washers 28A, 40A form the first races 36, 48 in the same manner as the L-shaped washers 28, 40. However, the flat washers 28A, 40A do not include a portion which overlaps the cages 32, 44 or rolling elements 34, 46 in the axial direction. Instead, the body portion 54 of the connecting sleeve 52 may serve as the missing axial flange, supporting ends of the flat washers 28A, 40A and possibly clipping to the cages 32, 44. This further integrates the connecting sleeve 52 with the bearings 16A, 18A of the bearing assembly 14A and also reduces the number of components needed. In some embodiments, it the flat washers 28A, 40A may be integrally formed as one piece with the connecting sleeve 52.

During an exemplary assembly process for the carrier hub assembly 10, the pre-assembled bearings 16, 18 may be positioned on the opposing face surfaces 22, 24 of the carrier hub 12 and the connecting sleeve 52 moved into place to retain the components together. In other examples the bearings 16, 18 may be assembled on the carrier hub 12. For example, the first washers 28, 40 (or 28A, 40A) and connecting sleeve 52 may be positioned on the carrier hub 12 first, and the additional components of the bearings 16, 18 (or 16A, 18A) may be installed onto the interconnected washers 28, 40 (or 28A, 40A), carrier hub 12, and connecting sleeve 52.

The resulting carrier hub assembly includes the carrier hub and at least one bearing connected to each other by a connecting sleeve. This construction retains the components to each other prior to installation in the overall assembly, simplifying the assembly process and helping to avoid misalignment and potential damage to the components. In particular, the tiered construction of the disclosed hub assembly may be delivered and installed as a completed sub-assembly with both bearings already attached. In addition, because the bearings are already positioned by the connecting sleeve, the need for piloting features on the carrier hub is eliminated.

The disclosed carrier hub assembly is particularly applicable to planetary transmission assemblies. For example, the bearing assembly is particularly suitable for use in combination with a ring gear carrier hub or a clutch carrier hub, but is not limited to these. The disclosed connecting sleeve does not add significant bulk to the overall assembly and therefore simplifies the overall assembly process without taking up much space or significant additional cost, if any at all.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

COMPONENT LIST

10. Carrier Hub Assembly
10A. Carrier Hub Assembly
12. Carrier Hub
14. Bearing Assembly
14A. Bearing Assembly
16. First Bearing
16A. First Bearing
18. Second Bearing
18A. Second Bearing
20. End Portion
22. First Face Surface
24. Second Face Surface
26. End Surface
28. First Washer
28A. First Washer
30. Second Washer
32. Cage
34. Rolling Element
36. First Race
38. Second Race
40. First Washer
40A. First Washer
42. Second Washer
44. Cage
46. Rolling Element
48. First Race
50. Second Race
52. Sleeve
54. Body Portion
56. Axial End Portion
58. Axial End Portion
60. Flange
62. Retention Tab
64. Flexible Extension
100. Transmission
110. Carrier Hub
120. Ring Gear
130. Thrust Bearing
140. Thrust Bearing
150. Inner End

What is claimed is:

1. A carrier hub assembly, comprising:
a carrier hub including an end portion having a first face surface and a second face surface; and
a bearing assembly, comprising:
a first bearing positioned on the first face surface and including a first washer forming a first inner race, a second washer forming a first outer race, a first cage, and a first plurality of rolling elements;
a second bearing positioned on the second face surface and including a third washer forming a second inner race, a fourth washer forming a second outer race, a second cage, and a second plurality of rolling elements; and
a connecting sleeve connecting the first bearing to the second bearing, the connecting sleeve including a first axial end each defining a first radially extending tab and a second axial end defining a second radially extending tab,
wherein the connecting sleeve retains the first bearing and the second bearing on the carrier hub, and the first and second radially extending tabs each overlap in an axial direction with at least one of: (i) the first washer and the third washer, or (ii) the first cage and the second cage.

2. The carrier hub assembly of claim 1, wherein the end portion of the carrier hub is an inner diameter of the carrier hub.

3. The carrier hub assembly of claim 2, wherein the end portion of the carrier hub includes an end surface defining the inner diameter and the connecting sleeve includes an axial length which is greater than a length the end surface.

4. The carrier hub assembly of claim 1, wherein the first plurality of rolling elements and the second plurality of rolling elements are needles.

5. The carrier hub assembly of claim 1, wherein the first and second radially extending tabs each contact a respective one of the first and second bearings.

6. The carrier hub assembly of claim 5, wherein the first and second radially extending tabs are each configured to abut a respective portion of the first or second bearing and inhibit the first and second bearings from sliding off of the connecting sleeve.

7. The carrier hub assembly of claim 5, wherein the at least one of the first and second radially extending tabs includes a plurality of retention tabs configured to clip to a portion of the first or second bearing.

8. The carrier hub assembly of claim 7, wherein the portion of the first or second bearing is the first or second cage.

9. The carrier hub assembly of claim 7, wherein the connecting sleeve includes a plurality of flexible extensions, and the retention tabs are formed on the flexible extensions.

10. The carrier hub assembly of claim 1, wherein the first washer, the second washer, the third washer, and the fourth washer are L-shaped including an axial flange and a radial flange.

11. The carrier hub assembly of claim 1, wherein at least the first washer and the third washer are flat washers.

\* \* \* \* \*